United States Patent
Copeland et al.

(10) Patent No.: US 11,009,084 B1
(45) Date of Patent: May 18, 2021

(54) METHODS AND APPARATUSES FOR CLUTCH ASSEMBLY PERFORMANCE ENHANCEMENT

(71) Applicant: Sonnax Transmission Company, Bellows Falls, VT (US)

(72) Inventors: Brian T. Copeland, Keene, NH (US); Gregg A. Nader, Chester, VT (US)

(73) Assignee: Sonnax Transmission Company, Bellows Falls, VT (US)

( * ) Notice: Subject to any disclaimer, the term of this patent is extended or adjusted under 35 U.S.C. 154(b) by 24 days.

(21) Appl. No.: 16/672,812

(22) Filed: Nov. 4, 2019

Related U.S. Application Data

(63) Continuation of application No. 15/177,035, filed on Jun. 8, 2016, now Pat. No. 10,480,592.

(51) Int. Cl.
*F16D 13/54* (2006.01)
*F16D 25/0638* (2006.01)

(52) U.S. Cl.
CPC ......... *F16D 25/0638* (2013.01); *F16D 13/54* (2013.01)

(58) Field of Classification Search
CPC ... F16D 13/54; F16D 25/0638; F16D 2300/12
See application file for complete search history.

(56) References Cited

U.S. PATENT DOCUMENTS

| | | | |
|---|---|---|---|
| 3,814,226 | A | 6/1974 | White |
| 4,724,941 | A | 2/1988 | Wirkner |
| 4,753,132 | A | 6/1988 | Sumiya et al. |
| 5,421,439 | A | 6/1995 | Hayasaki |
| 5,445,258 | A | 8/1995 | Bigley et al. |
| 6,021,879 | A | 2/2000 | Pelouch |
| 6,920,970 | B1 | 7/2005 | Dumas |

(Continued)

FOREIGN PATENT DOCUMENTS

| | | |
|---|---|---|
| DE | 102009021347 A1 | 12/2009 |
| DE | 102009021348 A1 | 12/2009 |

OTHER PUBLICATIONS http://www.sonnax.com/parts/3781-smart-tech-10-clutch-drum-kit (Last viewed Jun. 2, 2016).

(Continued)

*Primary Examiner* — Huan Le
(74) *Attorney, Agent, or Firm* — Levenfeld Pearlstein, LLC

(57) ABSTRACT

Methods and apparatuses can be used to adjust the torque transfer capacity and improve the overall performance and longevity of a clutch assembly. Through the use of various improved clutch components disclosed herein, it is possible to: (1) increase clutch apply forces through an increase in the fluid pressure apply surface area, or piston reaction area, of a clutch piston, thereby increasing frictional forces generated within a clutch pack for transferring input torque from a drive shaft to a driven shaft; (2) improve clutch plate contact conditions through a more rigid clutch pressure plate configuration, thereby reducing clutch pack/plate distortion and supporting structure deformation and/or wear that can otherwise lead to excessive heat generation and overall clutch performance degradation and/or failure; and/or (3) improve the clutch assembly's ability to dissipate and/or tolerate heat generated through clutch plate friction by means of an improved clutch pack configuration.

13 Claims, 7 Drawing Sheets

(56) References Cited

U.S. PATENT DOCUMENTS

| | | | |
|---|---|---|---|
| 7,204,357 B1* | 4/2007 | Dumas | F16D 25/0638 |
| | | | 192/70.12 |
| 9,284,993 B1* | 3/2016 | Kalinsky | F16D 25/0635 |
| 10,821,827 B1* | 11/2020 | Stevens | F16D 25/0638 |
| 2005/0217962 A1 | 10/2005 | Pedersen | |
| 2013/0015032 A1* | 1/2013 | Mangiagli | F16D 13/683 |
| | | | 192/66.32 |

OTHER PUBLICATIONS http://suncoastdiesel.com/M3GA-961-554-DRUM-WPPLATES_p_164.html (Apr. 30, 2016).

Audebert, Nadine, et al., "Buckling of Automatic Transmission Clutch Plates Due to Thermoelastic/Plastic Residual Stresses," Department of Mechanical Engineering and Applied Mechanics, University of Michigan. Journal of Thermal Stresses, 21:309-326 (Apr. 1, 1998).

Zagrodzki, Przemyslaw, et al. "Thermomechanical Effects in a Single-Sided Multidisk Clutch/Brake Design," Raytech Composites, Inc. SAE Technical Paper Series, 2002-01-1439 (Mar. 19-21, 2002).

\* cited by examiner

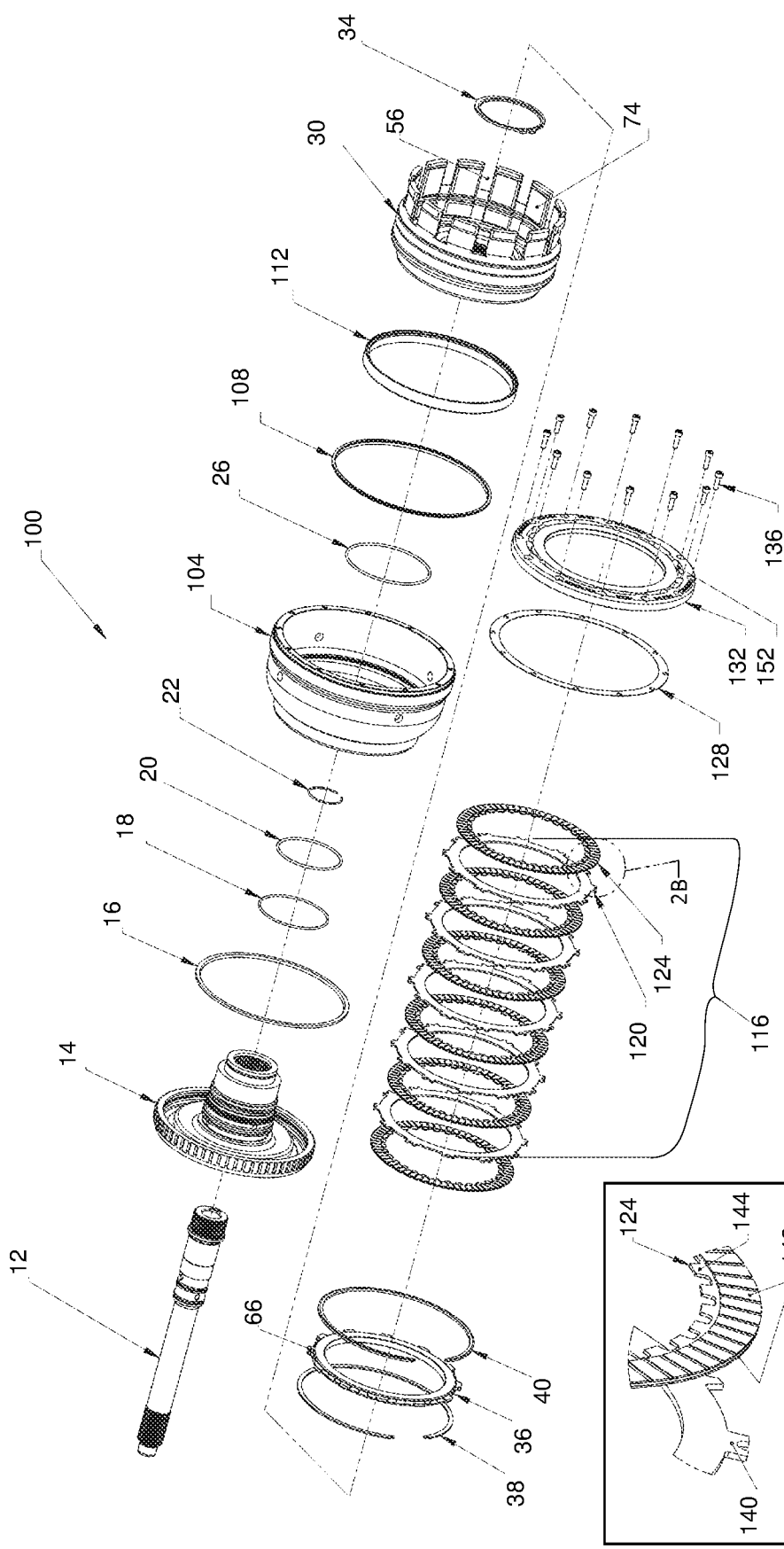

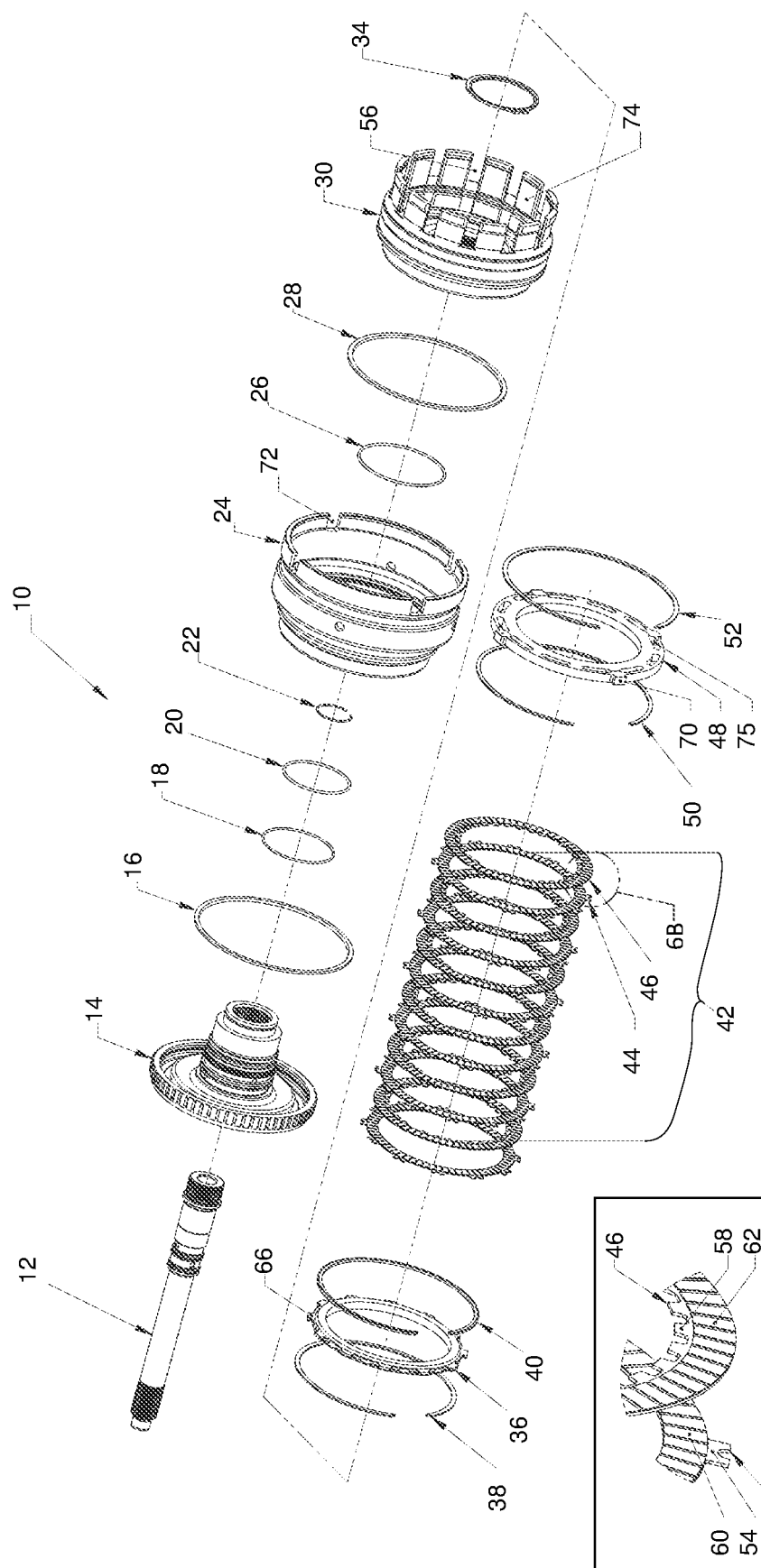
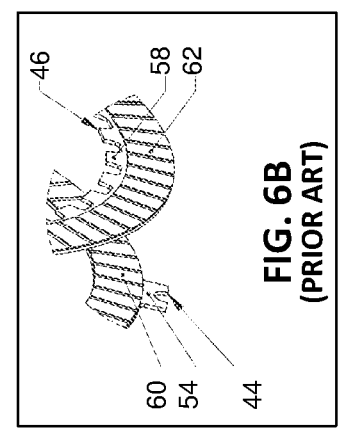
FIG. 6A (PRIOR ART)
FIG. 6B (PRIOR ART)

METHODS AND APPARATUSES FOR CLUTCH ASSEMBLY PERFORMANCE ENHANCEMENT

CROSS-REFERENCE TO RELATED APPLICATION DATA

This application is a continuation of U.S. patent application Ser. No. 15/177,035, filed Jun. 8, 2016, titled, METHODS AND APPARATUSES FOR CLUTCH ASSEMBLY PERFORMANCE ENHANCEMENT.

FIELD OF THE INVENTION

The present invention generally relates to the field of vehicular transmissions. In particular, the present invention is directed to methods and apparatuses for clutch assembly performance enhancement.

BACKGROUND

Automotive transmissions include, among other components, a clutch assembly. The interposition of the clutch assembly between a drive shaft and a driven shaft permits the drive shaft, connected to a motor or an engine, to be releasably coupled to the driven shaft. This coupling through the clutch assembly may cause the driven shaft to rotate at the same rate as the drive shaft; it may also enable a driven shaft to rotate at a different rotation rate from the drive shaft or to be completely decoupled from the drive shaft.

One component of the clutch assembly that enables the releasable coupling of the drive shaft to the driven shaft is a stack of friction elements often referred to as a clutch pack. Clutch packs typically comprise interleaved disks often referred to as clutch plates; some of these plates have friction material bonded to opposing faces of a steel core plate, often referred to as double-sided clutch plates, while others are bare steel clutch plates without any friction material. Clutch plates are alternately stacked such that the friction material on one plate contacts a mating steel reaction face of an adjacent steel clutch plate. As an alternative to double-sided clutch plates, another type of clutch plate, sometimes referred to as a single-sided clutch plate, has friction material bonded to a single face of a steel core plate with the opposing face of the steel core plate left bare. Similarly to double-sided clutch plates, single-sided clutch plates are stacked such that the friction material on one plate contacts a mating steel reaction face of an adjacent clutch plate.

Interleaved stacks of clutch plates can transfer torque from a drive shaft to a driven shaft via friction at the mating faces, or they can be decoupled from one of the shafts, thereby preventing the transfer of torque. Given this arrangement, a clutch assembly is limited in the amount of torque that it can transfer from the drive shaft to the driven shaft in part by the torque that the clutch pack can withstand without excessive slippage. When an upper frictional torque limit is exceeded, the clutch plates in the clutch pack can slip with respect to one another. Excessive slippage results in clutch performance degradation and premature clutch plate wear and failure.

As shown in FIGS. 5 and 6A, a traditional clutch assembly 10, in this example an OEM clutch assembly for Chrysler transmission model numbers 68RFE, 45RFE and 545RFE, may include an input (or drive) shaft 12, a clutch hub 14, a lip seal 16, o-rings 18 and 20, an input shaft retaining ring 22, a clutch piston 24, an o-ring 26, a lip seal 28, an annular clutch retainer 30, a retaining ring 34, a clutch reaction plate 36, reaction plate retaining rings 38 and 40, a clutch pack 42 (consisting of six externally-toothed single-sided clutch plates 44 and six internally-toothed singled-sided clutch plates 46), a clutch pressure plate 48, and pressure plate retaining rings 50 and 52.

With reference to FIGS. 5, 6A, and 6B, rotation and axial translation of the clutch assembly components occurs about and along central axis (A). Clutch reaction plate 36 and single-sided, externally-toothed clutch plates 44 have external teeth 66 and 54, respectively, located along their outer perimeters, which engage corresponding slots 56 in clutch retainer 30. Single-sided, internally-toothed single-sided clutch plates 46 have internal teeth 58 located along their inner diameters that engage corresponding external teeth on an outer surface of a driven shaft, e.g., an intermediate or output shaft (not shown). Single-sided, externally-toothed clutch plates 44 include a layer of friction material 60 bonded to one face with bare steel exposed on the opposite face; similarly, single-sided, internally-toothed clutch plates 46 include a layer of friction material 62 bonded to one face with bare steel exposed on the opposite face. Clutch plates 44 and 46 are then interleaved such that all of the friction material faces the same direction in order to create clutch pack 42. Clutch retainer 30 is held fixed axially to clutch hub 14 by retaining ring 34, and rotationally through spline 64. With respect to clutch retainer 30, clutch reaction plate 36 is held fixed axially by retaining rings 38 and 40, and rotationally by external teeth 66 that engage clutch retainer slots 56. With respect to clutch piston 24, clutch pressure plate 48 is held in place axially by retaining rings 50 and 52, and rotationally by external teeth 70, that engage slots 72 in clutch piston 24. Clutch piston 24 is indirectly located rotationally by tabs 74 on clutch retainer 30, by way of slots 75 in clutch pressure plate 48. In operation, input shaft 12, clutch hub 14, clutch retainer 30, clutch reaction plate 36, clutch piston 24, clutch plates 44, and clutch pressure plate 48 rotate in unison.

To engage traditional clutch assembly 10, as shown in FIG. 5, pressurized fluid passes through ports 76 and into the annular piston chamber 78. This fluid pressure causes clutch piston 24 to translate axially from right to left along axis (A) from the perspective of FIG. 5. This translation causes clutch pressure plate 48 to contact clutch pack 42. Once contact is established, the fluid pressure in chamber 78 causes clutch pressure plate 48 to compress the clutch plates in clutch pack 42. This compressive force generates the frictional force required to make the clutch plates in clutch pack 42 resist slippage, thereby allowing the input torque from input shaft 12 to be transferred through traditional clutch assembly 10 to an output shaft (not shown). When the clutch is engaged in this fashion, the entire clutch assembly rotates as a unit. As shown in FIG. 5, when a transmission including traditional clutch assembly 10 is properly assembled, the clutch assembly is installed along with other components within a housing 80 that protects the components from dirt and debris and helps to ensure proper lubrication is maintained.

SUMMARY OF THE DISCLOSURE

In one aspect, the present disclosure is directed to a kit for adjusting clutch apply forces in a clutch assembly, wherein the clutch assembly is formed around a shaft axis and comprises an annular clutch retainer with an inner annular piston sealing surface, an outer annular piston sealing surface, the sealing surfaces lying parallel to the shaft axis, and a first annular clutch piston having an effective piston reaction area defined between an inner seal mating with the inner annular piston sealing surface and an outer seal mating with the outer annular piston sealing surface. The kit may include: a sleeve with a first annular thickness, an inner annular diameter, and an outer annular diameter, wherein the inner annular diameter is configured and dimensioned to be positioned against the outer annular piston sealing surface and the outer annular diameter comprises a new outer annular piston sealing surface; and a replacement annular clutch piston having an enlarged effective piston reaction area defined between the inner seal and an outer seal configured to mate with the new outer annular piston sealing surface on the sleeve.

In another aspect, the present disclosure is directed to a method of installing a sleeve and a clutch piston in a clutch assembly, wherein the clutch assembly is formed around a shaft axis and comprises an annular clutch retainer with an inner annular piston sealing surface, an outer annular piston sealing surface, the sealing surfaces lying parallel to the shaft axis, and a first annular clutch piston having an effective piston reaction area defined between an inner seal mating with the inner annular piston sealing surface and an outer seal mating with the outer annular piston sealing surface. The method may include: removing the first annular clutch piston, and installing a replacement annular clutch piston and the sleeve, wherein the sleeve has a first annular thickness, an inner annular diameter, and an outer annular diameter, wherein the inner annular diameter is configured and dimensioned to be positioned against the outer annular piston sealing surface and the outer annular diameter comprises a new outer annular piston sealing surface, and the replacement annular clutch piston has an enlarged effective piston reaction area defined between the inner seal and an outer seal configured to mate with the new outer annular piston sealing surface on the sleeve.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2A is an exploded view of the clutch assembly of FIG. 1;

FIG. 2B is a detail view at circle 2B in FIG. 2A illustrating clutch plates also shown in FIGS. 1 and 2A;

FIG. 6A is an exploded view of the prior art OEM clutch assembly of FIG. 5;

FIG. 6B is a detail view at circle 6B in FIG. 6A illustrating clutch plates also shown in FIGS. 5 and 6A.

DETAILED DESCRIPTION

Aspects of the present disclosure include methods and apparatuses to adjust the torque transfer capacity and improve overall performance and longevity of clutch assemblies in Chrysler transmission model numbers 68RFE, 45RFE, and 545RFE. Persons of skill in the art will appreciate that aspects of disclosed embodiments may also be applied in other transmissions. Through the use of various improved clutch components disclosed herein, without other modification to the OEM transmission components or housing, it is possible to: (1) increase clutch apply forces through an increase in the fluid pressure apply surface area, or piston reaction area, of a clutch piston, thereby increasing frictional forces generated within a clutch pack for transferring input torque from a drive shaft to a driven shaft; (2) improve clutch plate contact conditions through a more rigid clutch pressure plate configuration, thereby reducing clutch pack/plate distortion and supporting structure deformation and/or wear that can otherwise lead to excessive heat generation and overall clutch performance degradation and/or failure; and (3) improve the clutch assembly's ability to dissipate and/or tolerate heat generated through clutch plate friction by means of an improved clutch pack configuration. These improvements may be readily implemented in the OEM existing transmissions by use of the methodologies, apparatus and kits described herein. Unless otherwise indicated "OEM" as used herein refers to the unmodified Chrysler model number 68RFE, 45RFE, and 545RFE transmissions and/or the stock clutch assembly and clutch components provided therein.

Figure 1:
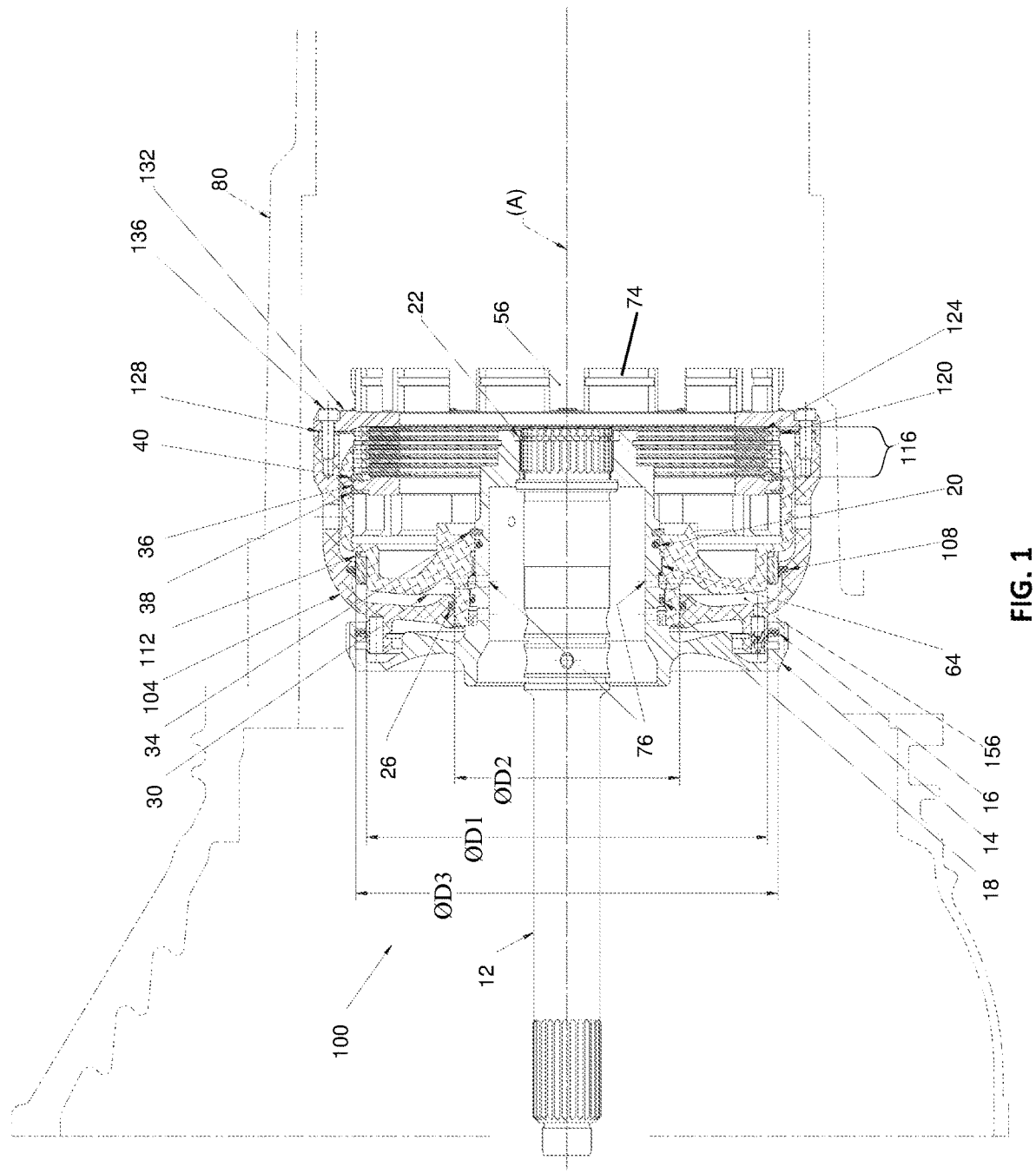
FIG. 1 is a cross-sectional assembly view of a clutch assembly employing an improvement kit in accordance with the teachings of the present disclosure, wherein the clutch assembly is in an engaged condition.

FIGS. 1-4 illustrate aspects of an improved clutch assembly 100 comprising an OEM clutch assembly in which a kit as disclosed herein is installed according to the methodology described. As shown in FIGS. 1, 2A, and 2B, clutch assembly 100 retains many of the components from the OEM clutch assembly 10 shown in FIGS. 5, 6A, and 6B. As will be appreciated, new or replacement components are identified by 100-series reference numerals and, as such, may comprise one or more kits for improvement of the OEM clutch assembly as described herein. In some embodiments, two or more kits including select subgroups of the 100-series components may be used to implement one or more of the three improvements listed above. Note that reused components of the OEM clutch assembly as described above are not further described except to the extent they may cooperate with kit components or be a part of the methods described herein below.

As shown in FIGS. 1 and 2A, improved clutch assembly 100 may include a clutch piston 104, a lip seal 108, a clutch retainer adapter sleeve 112, a clutch pack 116 (consisting of interleaved steel clutch plates 120 and double-sided friction clutch plates 124), one or more clutch pressure plate shim(s) 128, a clutch pressure plate 132, and clutch pressure plate fasteners 136. Clutch reaction plate 36 and steel clutch plates 120 have external teeth, i.e., teeth 66 and 140, respectively, located along their outer perimeters, which engage corresponding slots 56 in clutch retainer 30. Double-sided clutch plates 124 have internal teeth 144 located along their inner diameters that engage corresponding external teeth on an outer surface of a driven shaft, e.g., an intermediate or output shaft (not shown). As indicated in FIG. 2B, double-sided clutch plates 124 include one or more layers of friction material 148 bonded to each face. Steel clutch plates 120 are interleaved with double-sided clutch plates 124 to create clutch pack 116. Clutch piston 104 is indirectly located rotationally by tabs 74 on clutch retainer 30, by way of slots 152 in clutch pressure plate 132. With respect to clutch piston 104, clutch pressure plate shim(s) 128 and clutch pressure plate 132 are held in place both axially and rotationally by fasteners 136.

Figure 5:
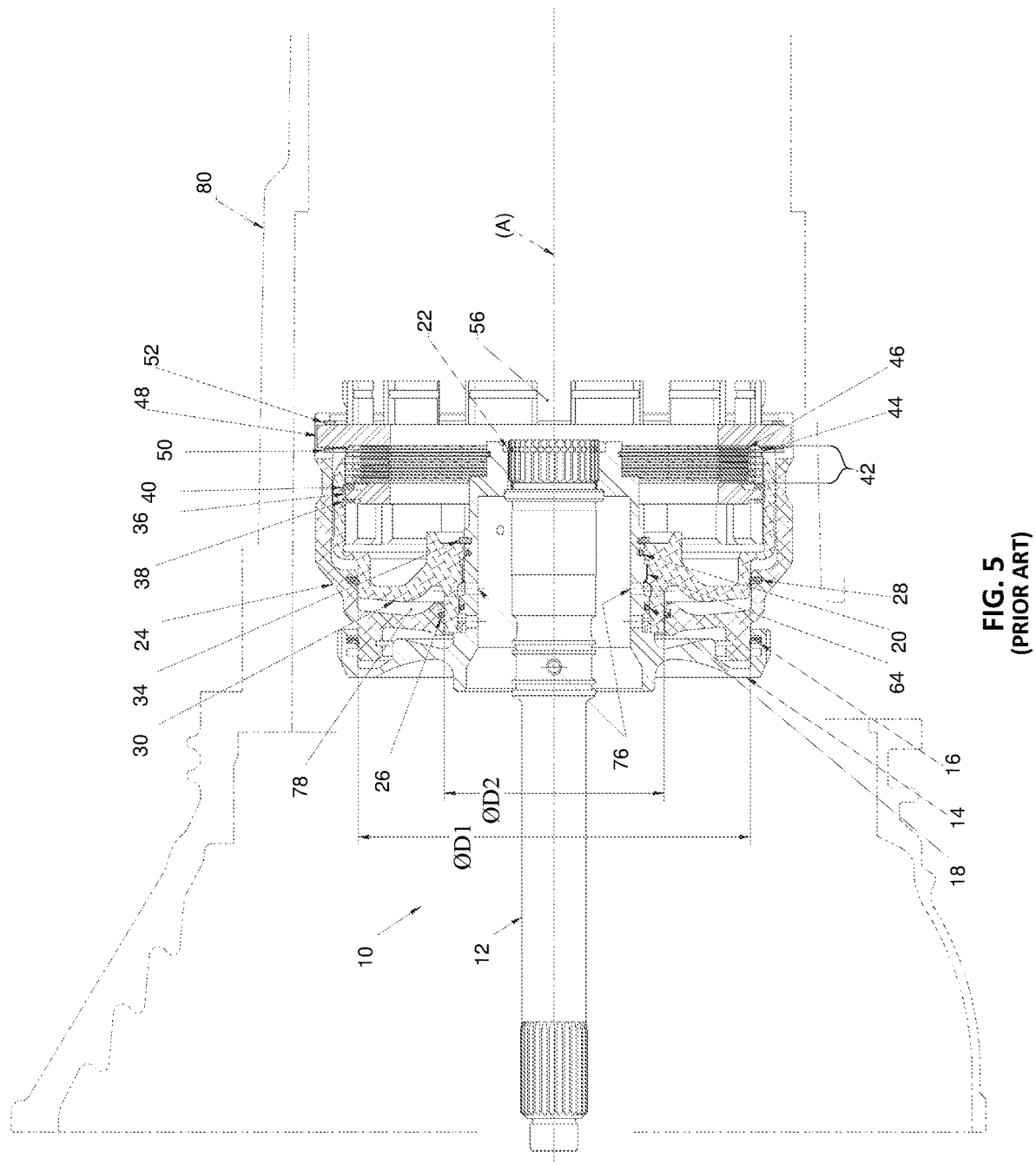
FIG. 5 is a cross-sectional assembly view of a prior art OEM clutch assembly, wherein the clutch assembly is in an engaged condition.

As shown in FIGS. 1 and 5, when an OEM clutch assembly 100, is retrofitted with a kit as described in accordance with improved clutch assembly 100, the improved clutch assembly is re-installed along with other components within the OEM housing 80 without need for modification of the OEM housing to accommodate any of the new components or improvements. In operation, when improved clutch assembly 100 is engaged, as shown in FIG. 1, input shaft 12, clutch hub 14, clutch retainer 30, clutch reaction plate 36, clutch piston 104, clutch plates 120, clutch pressure plate shim(s) 128 and clutch pressure plate 132 rotate in unison.

Pressurized fluid again passes through ports 76 and into the annular piston chamber 156. This fluid pressure causes clutch piston 104 to translate axially from right to left along axis (A) from the perspective of FIG. 1. This translation causes clutch pressure plate 132 to contact clutch pack 116. Once contact is established, the fluid pressure in chamber 156 causes clutch pressure plate 132 to compress the clutch plates in clutch pack 116. This compressive force generates the frictional force required to make the clutch plates in clutch pack 116 resist slippage, thereby allowing the input torque from input shaft 12 to be transferred through clutch assembly 100 to an output shaft (not shown). When the clutch is engaged in this fashion, the entire clutch assembly rotates as a unit.

With reference to FIGS. 1-3A, clutch retainer adapter sleeve 112 is used to enable an increase in the piston reaction area, thereby increasing clutch piston axial apply forces for a given fluid apply pressure. Adapter sleeve 112 thus permits reuse of OEM clutch retainer 30, so that clutch apply forces can be increased while making use of an existing clutch component. Mating clutch piston 104 and lip seal 108 are configured and dimensioned to work in concert with adapter sleeve 112 to increase the piston reaction area as compared to the clutch piston/clutch retainer interface of OEM clutch assembly.

Figure 3A:
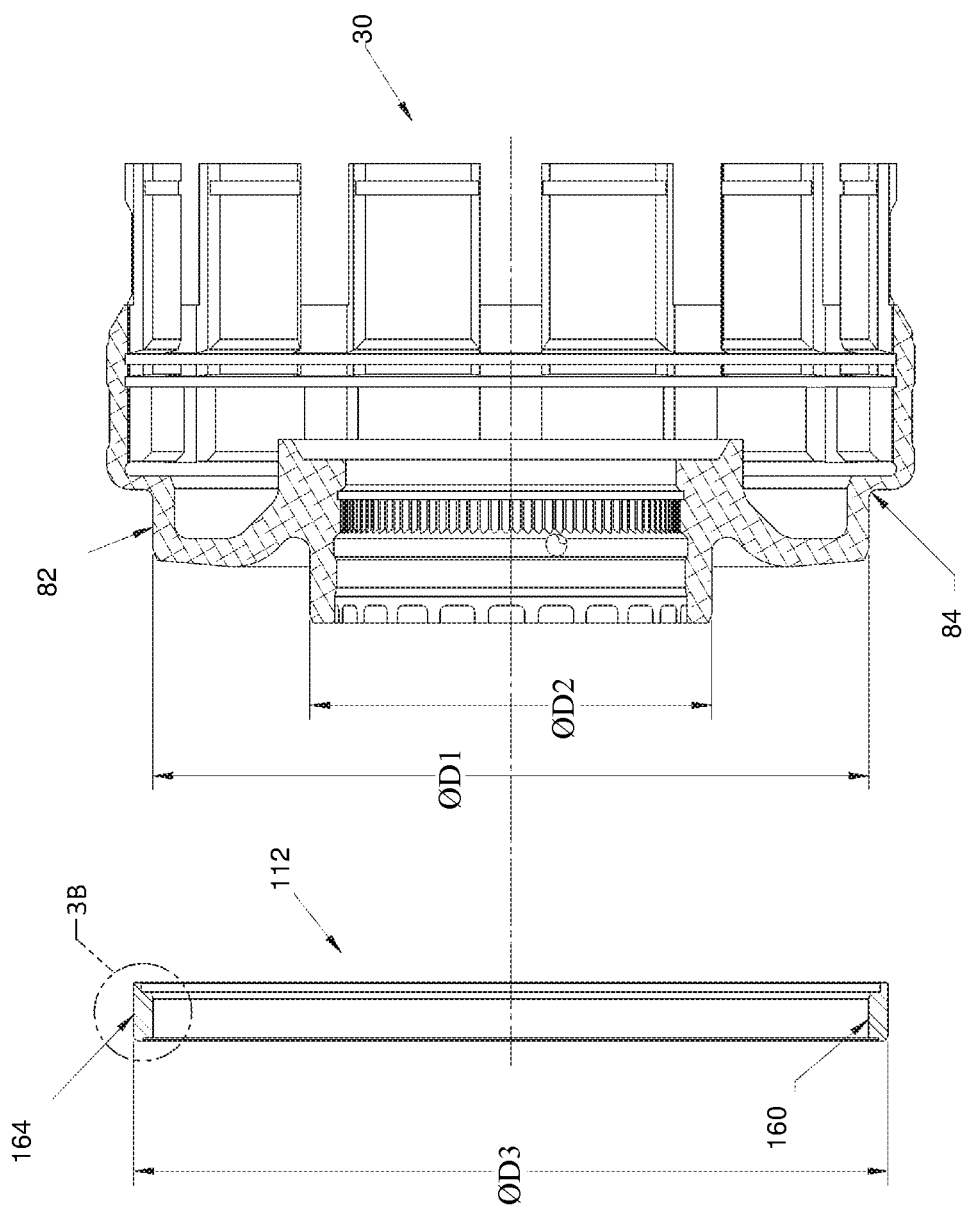
FIG. 3A is an exploded, partial cross-sectional view of select components of the clutch assembly shown in FIGS. 1 and 2A, emphasizing features of an adapter sleeve designed and configured to adjust a clutch assembly's torque transfer capacity.
Figure 3B:
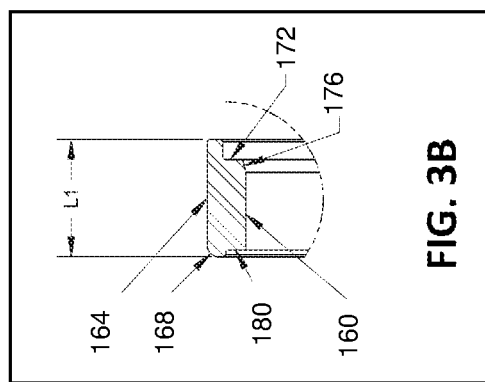
FIG. 3B is a detail view at circle 3B in FIG. 3A illustrating various aspects of the adapter sleeve of FIG. 3A.

FIG. 3A provides an exploded, partial cross-sectional view of clutch retainer 30 and clutch retainer adapter sleeve 112. Adapter sleeve 112 is generally an annular ring, which can be manufactured from steel or aluminum, among other materials, with an inner surface 160 configured and dimensioned to be positioned against an existing outer surface 82 on clutch retainer 30. The adapter sleeve has an outer surface 164 configured and dimensioned for use as a sealing surface for a seal (e.g., lip seal 108 in FIGS. 1 and 2A). In some embodiments, as shown in FIGS. 1 and 3A, inner surface 160 and outer surface 164 may lie parallel to shaft axis (A); however, in other embodiments, one or more of these surfaces may be angled or perpendicular relative to the shaft axis. Sleeve length L1 is of sufficient length to maintain the sealing contact of lip seal 108 over the entire actuation stroke of mating clutch piston 104. Additional features of adapter sleeve 112 are shown in FIG. 3B, which may be used together, as shown in FIG. 3B, or separately, as needed or desired. Radius 168 functions as a lead-in feature that facilitates installation of the clutch retainer 30/adapter sleeve 112 subassembly into the clutch piston 104/lip seal 108 subassembly without damaging lip seal 108. Relieved area 172 provides mating part clearance for radius 84 on clutch retainer 30. Chamfer 176 functions as a lead-in feature and eases installation of adapter sleeve 112 onto outer surface 82 of clutch retainer 30. Relieved area 180 may provide clearance for a mating part and/or limit the axial length of, for example, an interference fit portion of adapter sleeve 112, such that inner surface 160 has a greater axial extent than outer surface 164. Adapter sleeve 112 may be mechanically fastened to clutch retainer 30 at the interface of surfaces 160 and 82 via interference fit (e.g., press or shrink fit), via adhesive (e.g., a thread-locking or similar compound), and/ or via mechanical staking of the sleeve to the clutch retainer. In some applications, standard threaded fasteners may be used.

As noted above with reference to OEM clutch assembly 10, as depicted in FIGS. 5 and 6A, pressurized fluid flows through ports 76 and into an annular piston chamber. Fluid leakage from annular piston chamber 156 in improved clutch assembly 100 is prevented by virtue of the sealing action of o-ring 26 and lip seal 108. Fluid applies pressure equally and normal (perpendicular) to all surfaces within this annular chamber. The result of this equal distribution of fluid pressure is a combination of radial and axial force vectors that are directly proportional to the apply pressure and surface area to which it is applied. Because of equal and opposite apply and reaction force vectors, the resultant force that contributes to axial translation of piston 104 is equal to the sum of the force vectors acting parallel to central axis (A). This sum is calculated based on the effective (projected) piston reaction area in a plane perpendicular to central axis (A).

The effective (projected) piston reaction area in a clutch assembly of this type may be defined as:

$$A1=(\pi/4)(ØD1^2-ØD2^2) \ [in.^2],$$

where:
A1 is the effective piston reaction area of clutch piston 24 [in.$^2$],
ØD1 is the outer sealing diameter of clutch retainer 30 [in.], and
ØD2 is the inner sealing diameter of clutch retainer 30 [in.].

The resultant axial translation force is defined as:

$$F1=(P)(A1) \ [lbs.],$$

where:
F1 is the resultant axial translation force on clutch piston 24 [lbs.],
P is the fluid apply pressure [lb./in.$^2$], and
A1 is the effective piston reaction area of clutch piston 24 [in.$^2$].

In the case of the improved clutch assembly 100, and with reference to FIG. 1, the same principles regarding apply forces are in effect. However, in the case of the improved design depicted in FIG. 1, adapter sleeve 112 increases the effective outer sealing diameter of the clutch retainer 30. This, in combination with a corresponding change in design of the clutch piston 104 and lip seal 108, results in an enlarged effective piston reaction area.

The effective (projected) piston reaction area for improved clutch assembly 100 is defined as:

$$A2 = (\pi/4)(\O D3^2 - \O D2^2) \ [\text{in.}^2],$$

where:
- A2 is the effective piston reaction area of clutch piston 104 [in.²],
- ØD3 is the outer sealing diameter of adapter sleeve 112 [in.], and
- ØD2 is the inner sealing diameter of clutch retainer 30 [in.].

The resultant axial translation force is defined as:

$$F2 = (P)(A2) \ [\text{lbs.}],$$

where:
- F2 is the resultant axial translation force on clutch piston 104 [lbs.],
- P is the fluid apply pressure [lb./in.²], and
- A2 is the effective piston reaction area of clutch piston 104 [in.²].

By way of illustration only, an example of the percentage difference in the effective piston reaction area between the OEM clutch assembly and improved clutch assembly employing a kit as described herein can be calculated as about 16% for ØD1=6.457 in., ØD2=3.623 in., and ØD3=6.800 in. Assuming a fluid apply pressure of 200 lb./in.², the resultant increase in axial translation force in improved clutch assembly 100 over OEM clutch assembly 10 is approximately 715 lbs. A preferred magnitude of increased clutch piston reaction area and axial translation forces would typically be in the range of 10% to 30%. The amount of increase will generally be dependent on the relative size and proportions of the relevant components and the surrounding structures.

Figure 4:
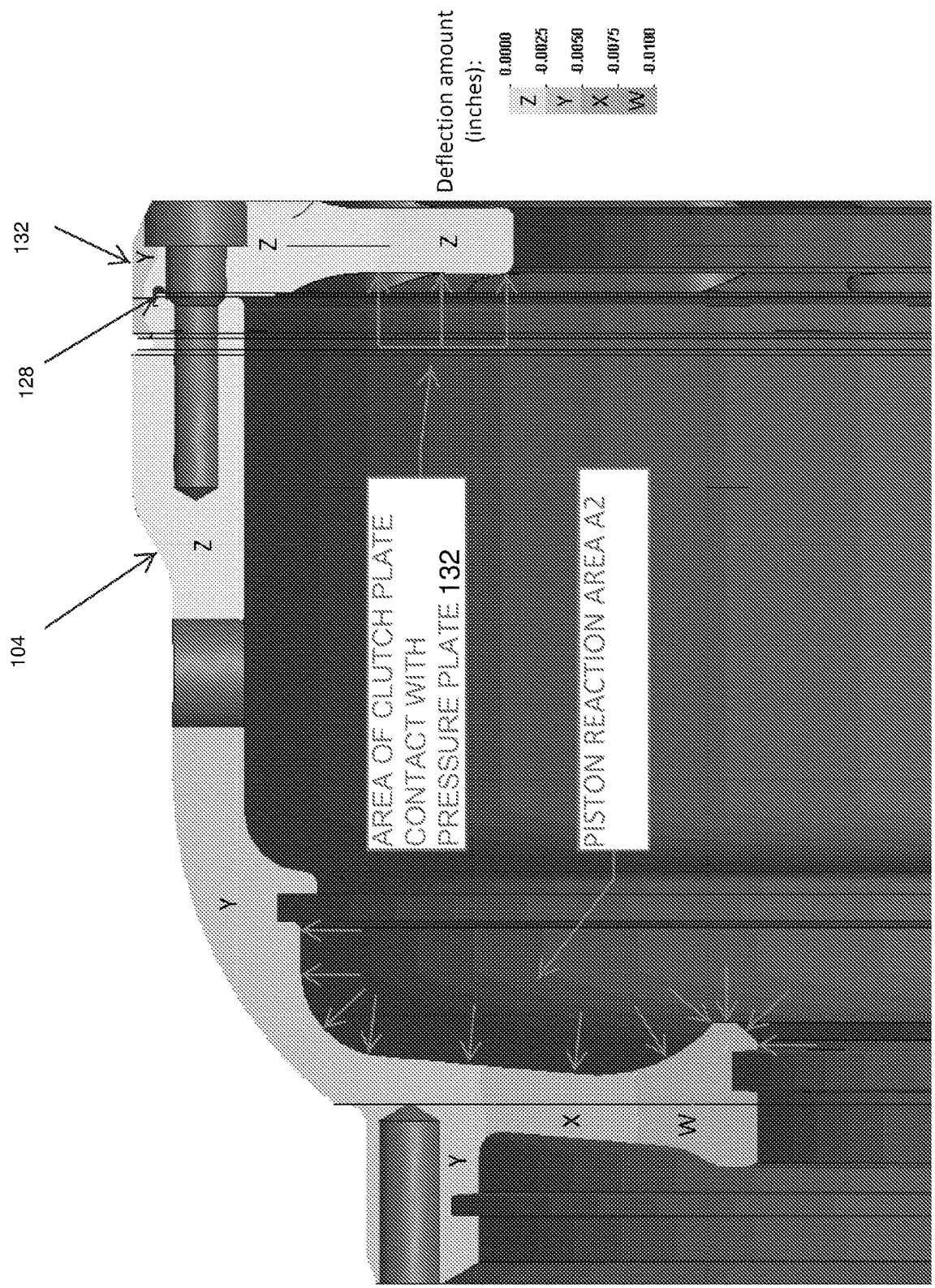
FIG. 4 is a cross-sectional view of select components of the clutch assembly shown in FIGS. 1 and 2A, illustrating amounts of horizontal deflection that occur within the assembly when the clutch is engaged.
Figure 7:
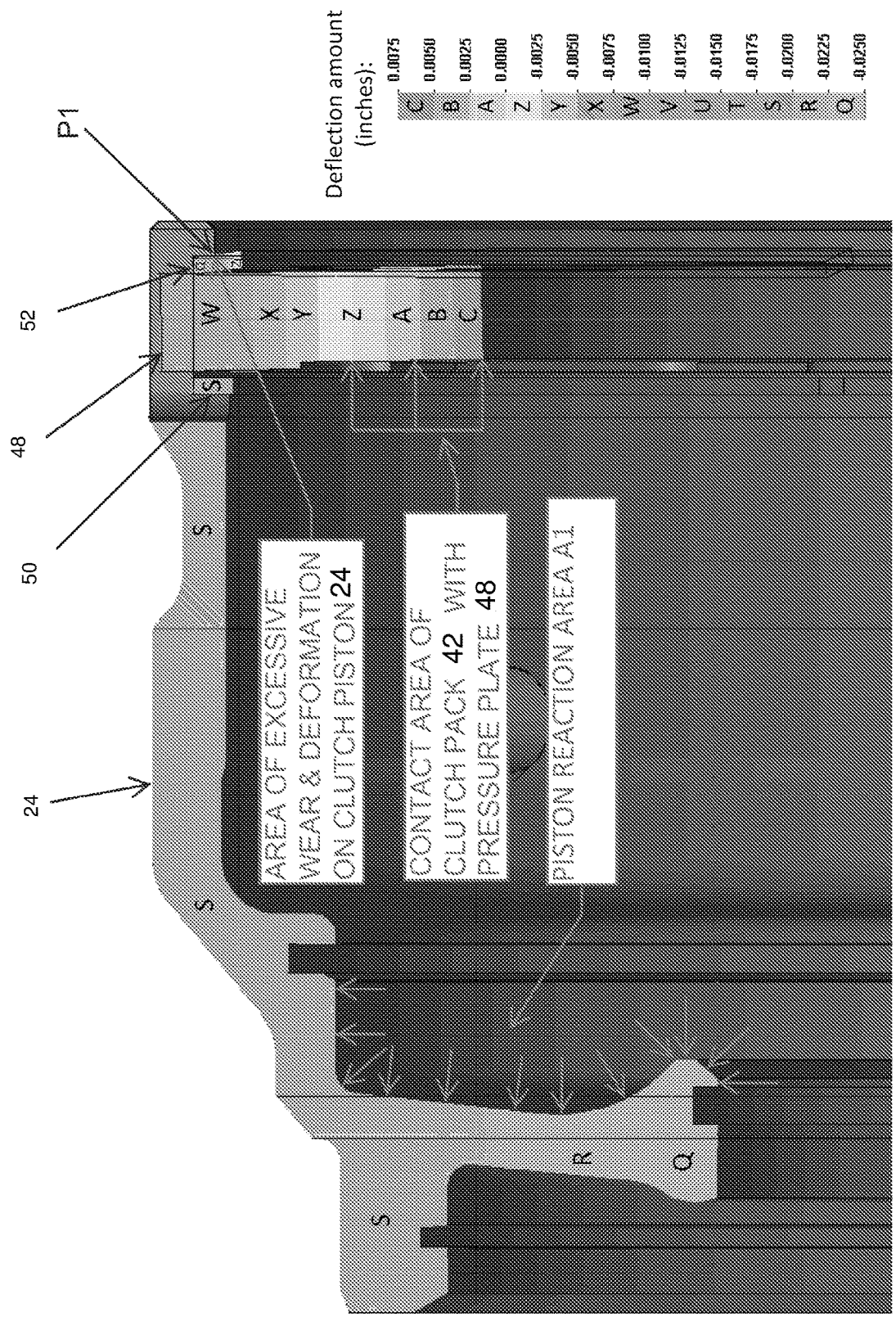
FIG. 7 is a cross-sectional view of select components of a prior art OEM clutch piston like that shown in FIGS. 5 and 6A, illustrating amounts of horizontal deflection that occur within the assembly when the clutch is engaged.

In addition to the increase in clutch apply forces that can be realized through use of clutch retainer adapter sleeve 112, clutch assembly 100 may employ more rigid clutch pressure plate configuration than that provided by the example clutch assembly 10. FIGS. 4 and 7 illustrate the differences in clutch pressure plate deflection between improved clutch assembly 100 and OEM clutch assembly 10. In both cases, the clutch fluid apply pressure is 200 psi., although other pressures may be used.

In FIG. 7, the surfaces to which the clutch fluid pressure is applied are identified along with the contact area of clutch pack 42 with clutch pressure plate 48. As can be seen in the illustration, the face of pressure plate 48 deflects axially approximately 0.010" over the surface area that is in contact with clutch pack 42. This deflection reduces clutch pack friction face contact at the clutch pack/pressure plate interface, as well as throughout clutch pack 42 itself. This condition results in the potential for increased clutch plate slippage and heat and a greater potential for clutch plate distortion. In addition, this deflection is magnified in pressure plate retaining ring 52, which results in the clutch apply forces being transferred into the retaining ring groove in clutch piston 24 through point or line contact at location P1, creating a high stress area that leads to high wear and material deformation of clutch piston 24. This condition causes further deterioration of the clutch plate contact conditions over time.

FIG. 4 illustrates the reduction in pressure plate deflection that can be realized with use of improved clutch assembly 100. The improved configuration utilizes bolt-on pressure plate 132 as opposed to one that is held in place via retaining rings. This, in combination with redesigned piston 104, creates a much more rigid pressure plate arrangement. Again, the surfaces to which the clutch fluid pressure is applied are identified along with the contact area of clutch pack 116 with clutch pressure plate 132. As can be seen in the illustration, the face of pressure plate 132 deflects axially approximately 0.0025" over the surface area in contact with clutch pack 116, a significant reduction in deflection as compared to OEM clutch assembly 10. It should be noted that, for a given clutch fluid apply pressure, this reduction in deflection occurs even though the axial clutch apply forces are approximately 16% greater with this configuration than those in effect with the OEM clutch assembly.

Improved clutch assembly 100 also may utilize an improved clutch pack 116. The improved design is intended to address problems related to clutch plate distortion caused by poor or uneven clutch plate heat transfer properties inherent in clutch packs that utilize single-sided clutch plates, such as traditional clutch pack 42. With reference to FIGS. 5, 6A, and 6B, as described above, traditional clutch pack 42 consists of interleaved, externally-toothed and internally-toothed, single-sided clutch plates 44 and 46. One of the functional characteristics of single-sided clutch plates is that the core disks are thermally insulated on one face due to the friction material bonded to that face. As a result, the opposing bare face of the core disk experiences a much higher operating temperature than the face that is insulated by the friction material. This condition leads to uneven temperature distribution, thermal expansion, and excessive internal stresses within the core disk, leading to clutch plate distortion and permanent deformation. Two main modes of out of plane bending have been observed. A first one is axisymmetric, in which the disc develops a conical shape, and is therefore colloquially referred to as "coning." The second is non-axisymmetric, having a sinusoidal shape around the circumference, and is sometimes colloquially referred to as the "pringling" bending mode. While not intending to be limited by any one particular theory, it is believed that a primary cause of both distortion modes is internal stresses created by temperature differentials across the contact surfaces of and within the clutch plates. As the clutch plates distort in this fashion, the undesirable contact conditions are further aggravated, leading to even greater heat generation and distortion.

With reference to FIGS. 1 and 2A, improved clutch assembly 100 seeks to counteract the above-noted shortcomings of traditional clutch pack 42 by utilizing improved clutch pack 116, which comprises double-sided friction clutch plates 124 interleaved with relatively thick steel clutch plates 120. In this configuration, friction clutch plates 124 have friction material 148 bonded to both faces of the core disk, thereby insulating the core plate from the heat generated at the frictional contact surfaces. In this configuration, both faces of the interleaved steel clutch plates 120 are in contact with the friction material of adjacent friction clutch plates 124, hence frictional heat generated at the clutch plate interfaces is more evenly distributed on both surfaces and within the steel clutch plates 120.

The relatively thick steel clutch plates 120 are more resistant to yielding than the comparatively thin core disks of the single-sided clutch plates 44 and 46 used in OEM clutch assembly 10. Further, the thicker steel clutch plates 120 create greater contact surface area between the external teeth 140 of clutch plates 120 and tabs 74 of clutch retainer 30. This increased contact surface area allows for greater transfer of heat from the steel clutch plates 120 to clutch retainer 30. The greater capacity for heat transfer helps dissipate the heat in the clutch pack area more efficiently. It should be noted that, due to the benefits of the more rigid design of the bolt-on clutch pressure plate 132, there is sufficient room for the slightly longer clutch pack 116, which allows for maintaining the same number of active frictional contact surfaces (i.e., twelve surfaces) as the single-sided design used in the OEM clutch assembly. Although these components are illustrated as being used within the same assembly in FIGS. 1 and 2A, they may be used independently of one another in some embodiments, with or without modification. For example, in some embodiments, a clutch piston similar to clutch piston 104, a lip seal similar to lip seal 108, and a clutch retainer adapter sleeve similar to clutch retainer adapter sleeve 112 may be provided in a kit that may be used to replace components in a traditional clutch piston assembly to increase clutch apply forces through an increase in the fluid pressure apply surface area of a clutch piston, thereby increasing frictional forces generated within a clutch pack for transferring input torque from a drive shaft to a driven shaft. Similarly, in some embodiments, a clutch piston similar to clutch piston 104, a clutch pressure plate similar to clutch pressure plate 132, and fasteners similar to fasteners 136 may be provided in a kit that may be used to replace components in a traditional piston assembly to improve clutch plate contact conditions through a more rigid clutch pressure plate configuration, thereby reducing clutch pack/plate distortion and supporting structure deformation and/or wear that can otherwise lead to excessive heat generation and overall clutch performance degradation and/or failure. Further, in some embodiments, a clutch pack like clutch pack 116 may be provided in a kit that may be used to replace clutch pack 42, to improve the clutch assembly's ability to dissipate and/or tolerate heat generated through clutch plate friction by means of an improved clutch pack configuration. Kits such as those described above may optionally include more or fewer components, may be combined to form alternative kits, and may provide new components to replace components that should be replaced at the time of installation of one or more of the kits. For example, a kit including a clutch pack like clutch pack 116 may include a new clutch reaction plate 36 and new reaction plate retaining rings 38 and 40 despite the fact that these components may not be strictly required in order to install such a kit.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A kit for modifying an OEM clutch assembly disposed in an OEM housing, wherein the OEM clutch assembly is formed around a shaft axis and comprises an annular clutch retainer with an inner annular piston sealing surface, an outer annular piston sealing surface, the inner and outer annular sealing surfaces aligned with the shaft axis, and a first annular clutch piston, the clutch assembly having a first clutch pack positioned therein having a length, the kit comprising:
   a replacement annular clutch piston; and
   a rigid clutch pressure plate mounted to the replacement clutch piston,
   wherein the replacement annular clutch piston and the rigid clutch pressure plate increase a distance, relative to an OEM clutch assembly, available for an associated replacement clutch pack.

2. The kit of claim 1, wherein the rigid clutch plate mounts to the replacement annular clutch piston by a plurality of fasteners.

3. The kit of claim 2, wherein the plurality of fasteners are threaded fasteners.

4. The kit of claim 3, wherein the threaded fasteners are bolts.

5. The kit of claim 1 further including a replacement clutch pack.

6. A method of modifying an OEM clutch assembly acting on an OEM clutch pack disposed in an OEM housing, wherein the OEM clutch assembly is formed around a shaft axis and comprises an annular clutch retainer with an inner annular piston sealing surface, an outer annular piston sealing surface, the sealing surfaces aligned with the shaft axis, and a first annular clutch piston, the OEM clutch assembly further including a clutch pressure plate, the method comprising:
   removing the clutch pressure plate;
   removing the first annular clutch piston;
   removing the clutch pack;
   installing a replacement clutch pack having a greater longitudinal length than a length of the OEM clutch pack;
   installing a replacement annular clutch piston;
   installing a replacement rigid clutch pressure plate; and
   securing the replacement rigid clutch pressure plate to the replacement annular clutch piston.

7. The method of claim 6, wherein the replacement rigid clutch pressure plate is secured to the replacement annular clutch piston by a plurality of fasteners.

8. The method of claim 7, wherein the plurality of fasteners are threaded fasteners.

9. The method of claim 8, wherein the threaded fasteners are bolts.

10. A method of modifying an OEM clutch assembly acting on an OEM clutch pack disposed in an OEM housing, the OEM clutch assembly including a first annular clutch piston, a clutch pressure plate and a clutch pack, the method comprising:
- removing the clutch pressure plate;
- removing the first annular clutch piston;
- removing the clutch pack;
- installing a replacement clutch pack having a greater longitudinal length than a length of the OEM clutch pack;
- installing a replacement annular clutch piston;
- installing a replacement rigid clutch pressure plate; and
- securing the replacement rigid clutch pressure plate to the replacement annular clutch piston.

11. The method of claim 10, wherein the replacement rigid clutch pressure plate is secured to the replacement annular clutch piston by a plurality of fasteners.

12. The method of claim 11, wherein the plurality of fasteners are threaded fasteners.

13. The method of claim 12, wherein the threaded fasteners are bolts.

\* \* \* \* \*